United States Patent [11] 3,584,782

[72] Inventor Glenn D. Bergland
Moris Township, Morris County, N.J.
[21] Appl. No. 741,507
[22] Filed July 1, 1968
[45] Patented June 15, 1971
[73] Assignee Bell Telephone Laboratories, Incorporated
Murray Hill, Berkeley Heights, N.J.

[54] FAST FOURIER TRANSFORM METHOD AND APPARATUS
20 Claims, 8 Drawing Figs.

[52] U.S. Cl. .......... 235/156
[51] Int. Cl. .......... G06f 7/38, G06f 15/34
[50] Field of Search .......... 235/152, 156

[56] References Cited

OTHER REFERENCES

" Fast Fourier Transform," IEEE SPECTRUM. E. O. Brigham, R. E. Morrow, Dec. 1967, Pg., 63—70

" What is the Fast Fourier Transform?" Cochran et al., PROCEEDINGS OF THE IEEE Vol. 55, No. 10, Pgs., 1664—1674, Oct. 1967

" An Algorithm For the Machine Calculation of Complex Fourier Series," J. W. Cooley & J. W. Tukey, MATHEMATICS OF COMPUTATION, Apr. 1965, Pgs., 297— 301.

" FFT-Shortcut to Fourier Analysis," R. Klahn et al., ELECTRONICS, Apr. 1968 Pgs., 124— 129

*Primary Examiner*—Malcolm A. Morrison
*Assistant Examiner*—James F. Gottman
*Attorneys*—R. J. Guenther and William L. Keefauver ABSTRACT: A method and apparatus is disclosed for performing fast Fourier transformations on real-valued input signals. A systematic procedure is followed in accessing operands on successive iterations, and a uniform set of operations are used at each such iteration. Reductions are realized in the number of redundant computations and the number of storage locations relative to the well-known complex-input transformation.

FIG. 1

| k | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| $k_4$ | 0 | | | | | | | | | | | | | | | | 1 | | | | | | | | | | | | | | | |
| $k_3$ | 0 | | | | | | | | 1 | | | | | | | | 0 | | | | | | | | 1 | | | | | | | |
| $k_2$ | 0 | | | | 1 | | | | 0 | | | | 1 | | | | 0 | | | | 1 | | | | 0 | | | | 1 | | | |
| $k_1$ | 0 | | 1 | | 0 | | 1 | | 0 | | 1 | | 0 | | 1 | | 0 | | 1 | | 0 | | 1 | | 0 | | 1 | | 0 | | 1 | |
| $k_0$ | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| $A_0(k)$ | $A_0(0)$ | $A_0(1)$ | INPUT DATA | | | | | | | | | | | | | | | | | | | | | | | | | | | | | |
| $A_1$ | ADD TERM BY TERM SECOND HALF AND FIRST 0° | | | | | | | | | | | | | | | | SUBTRACT TERM BY TERM 180° SECOND HALF FROM FIRST | | | | | | | | | | | | | | | |
| $A_2$ | 0° | | | | | | | | 180° | | | | | | | | 90° | | | | | | | | 270° | | | | | | | |
| $A_3$ | 0 | | | | 180° | | | | 90° | | | | 270° | | | | 45° | | | | 225° | | | | 135° | | | | 315° | | | |
| $A_4$ | 0 | | 180 | | 90 | | 270 | | 45 | | 225 | | 135 | | 315 | | 22.5 | | 202.5 | | 112.5 | | 292.5 | | 67.5 | | 247.5 | | 157.5 | | 337.5 | |
| $A_5$ | 0 | 180 | 90 | 270 | 45<br>225 | | 135<br>315 | | 22.5<br>202.5 | | 112.5<br>292.5 | | 67.5<br>247.5 | | 157.5<br>337.5 | | 11.25<br>191.25 | | 101.25<br>281.25 | | 56.25<br>236.25 | | 146.25<br>326.25 | | 33.75<br>213.75 | | 123.75<br>303.75 | | 78.75<br>285.75 | | 168.75<br>348.75 | |
| j | 0 | 16 | 8 | 24 | 4 | 20 | 12 | 28 | 2 | 18 | 10 | 26 | 6 | 22 | 14 | 30 | 1 | 17 | 9 | 25 | 5 | 21 | 13 | 29 | 3 | 19 | 11 | 27 | 7 | 23 | 15 | 31 |
| 32-j | | | | 8 | | 12 | | 4 | | 14 | | 6 | | 10 | | 2 | | 15 | | 7 | | 11 | | 3 | | 13 | | 5 | | 9 | | 1 |

INVENTOR
G. D. BERGLAND
BY R. O. Nimz
ATTORNEY

FIG. 2
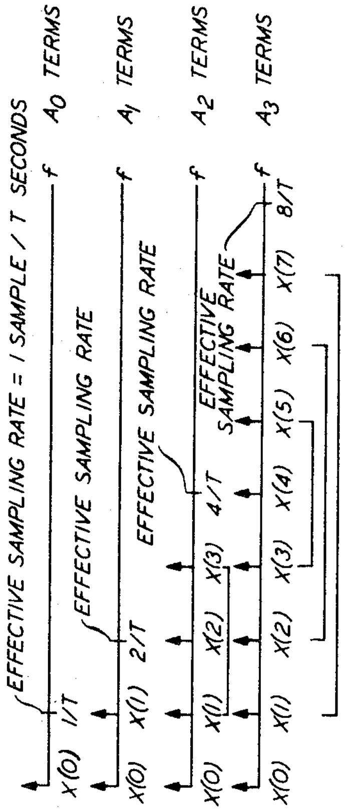
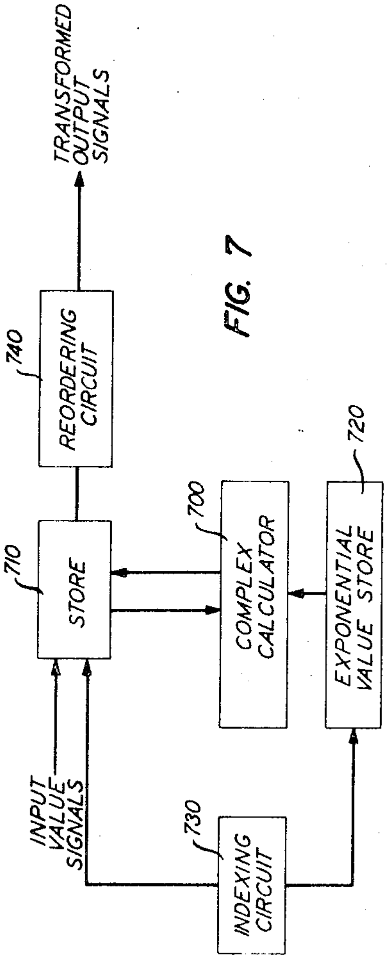
FIG. 7
| SEQUENCE OF 2 TERMS | 4 TERMS | 8 TERMS | 16 TERMS | 32 TERMS |
|---|---|---|---|---|
| 0 | 0 | 0 | 0 | 0 |
| | | | | 16 |
| | | | 8 | 8 |
| | | | | 24 |
| | | 4 | 4 | 4 |
| | | | | 28 |
| | | | 12 | 12 |
| | | | | 20 |
| | 2 | 2 | 2 | 2 |
| | | | | 30 |
| | | | 14 | 14 |
| | | | | 18 |
| | | 6 | 6 | 6 |
| | | | | 26 |
| | | | 10 | 10 |
| | | | | 22 |
| 1 | 1 | 1 | 1 | 1 |
| | | | | 31 |
| | | | 15 | 15 |
| | | | | 17 |
| | | 7 | 7 | 7 |
| | | | | 25 |
| | | | 9 | 9 |
| | | | | 23 |
| | 3 | 3 | 3 | 3 |
| | | | | 29 |
| | | | 13 | 13 |
| | | | | 19 |
| | | 5 | 5 | 5 |
| | | | | 27 |
| | | | 11 | 11 |
| | | | | 21 |
FIG. 6

FAST FOURIER TRANSFORM METHOD AND APPARATUS

This invention relates to methods and apparatus for signal processing. More particularly, this invention relates to methods and apparatus for the frequency analysis and synthesis of data signals. Still more particularly, this invention relates to methods and apparatus for performing fast Fourier transforms for real-valued input data signals.

BACKGROUND OF THE INVENTION

Machine methods for frequency analysis and synthesis of signals using Fourier series and integral techniques have long been important areas of scientific and engineering investigation. In recent years there have been developed improved means and methods for performing such analyses and syntheses. Among these improved techniques are included those known collectively as fast Fourier transform (FFT) techniques. These FFT techniques originated in recent history with a paper entitled "An Algorithm for the Machine Calculation of Complex Fourier Series," by J. W. Cooley and J. W. Tukey, *Mathematics of Computation*, Vol. 19, Apr. 1965, pp. 297—301. The computational advantages demonstrated by this paper have spurred research in areas previously felt to be beyond economic feasibility. These advantages, often involving computational savings of time and machine complexity of an order of magnitude or more compared with classical techniques, flow largely from judicious groupings and reorganizations of summation techniques known in the prior art.

Numerous improvements and variations of the original FFT techniques have been developed since the publication of the original Cooley-Tukey paper, several of which were summarized in the June 1967 issue of the *IEEE Transactions on Audio and Electroacoustics*, Vol. AU–15. Other important developments have been disclosed, for example in U.S. Pat. applications Ser. No. 605,768, by M. J. Gilmartin et al. filed Dec. 29, 1966, now U.S. Pat. No. 3,517,173, issued June 23, 1970, and G. D. Bergland et al., Ser. No. 605,791, filed Dec. 29, 1966.

The previously described development have all contemplated as input signals a sequence of complex-valued signals to be transformed into a series of complex-valued signals. That is, each element of the input sequence is represented by a two-part signal, one part corresponding to the real part of the input element and the other part corresponding to the imaginary part of the same complex element. Transformations performed on input signals not of this form would be processed in the prior art in exactly the same manner as if the input signals had been complex; no special advantage was shown to follow when the input signals were strictly real-valued signals. Some efforts were made which involved treating two real-valued input sequences as a single complex input, but these efforts gave rise to nonindependent results.

SUMMARY OF THE INVENTION

The present invention provides improvements to the heretofore known FFT methods and the apparatus for performing these methods, which improvements are especially adapted to efficiently perform Fourier transforms for real-valued input signals. The techniques of the present invention are more efficient in that they eliminate certain redundant computations required in the previously used methods. Thus, an economy of computational apparatus and apparatus for storing final and intermediate results are realized. In addition, because certain intermediate calculations previously thought to be essential can be eliminated using the present invention, there evolves an important saving in the time required to perform a transformation.

Briefly stated, the present invention in typical embodiment first requires that a real-valued input signal sequence be stored in a memory. These signals are then iteratively and selectively combined with each other and with selected exponential-valued signals in accordance with detailed methods given below. At each iteration, except the last, results are generated which are used as operands for the succeeding iteration; the operands for the first iteration are the results of the zeroth iteration, i.e., the input signals. The results of the last iteration are the desired complex Fourier coefficients corresponding to the input sequence.

Particular features and advantages of one or more embodiments of the present invention include the following:

1. Redundant Fourier coefficients in each iteration above one-half the effective sampling frequency are neither computed nor stored.
2. Intermediate results are accessed and stored in a regular and easily implemented pattern.
3. Real and imaginary parts of the final Fourier coefficient are formed in adjacent storage locations.
4. For the case of N real input values, only N real storage locations are required throughout the computation. These store the original data points, intermediate results, and final results.
5. The same set of complex arithmetic operations is performed throughout, with only the accessing order changed for real operands.
6. Powers of exponential factors used are called in the same order during each iteration.
7. Only $m-1$ complete iterations are required for the case of $N=2^m$ input sample values.

BRIEF DESCRIPTION OF THE DRAWINGS

These features and others will be more completely understood with reference to the following detailed description and the attached figures wherein:

FIG. 1 is a chart useful in understanding prior art FFT techniques and identifying certain redundancies inherent therein;

FIG. 2 is a sequence of graphs showing coefficients generated in successive prior art FFT iterations and indicating conjugate relationships existing in these coefficients;

FIG. 6 is a table useful in specifying an algorithm for selecting exponential valued signals from a stored table as they are required;

FIG. 7 is a block diagram of apparatus for performing the algorithms of the present invention.

NOTATION AND NOMENCLATURE

Figure 3:
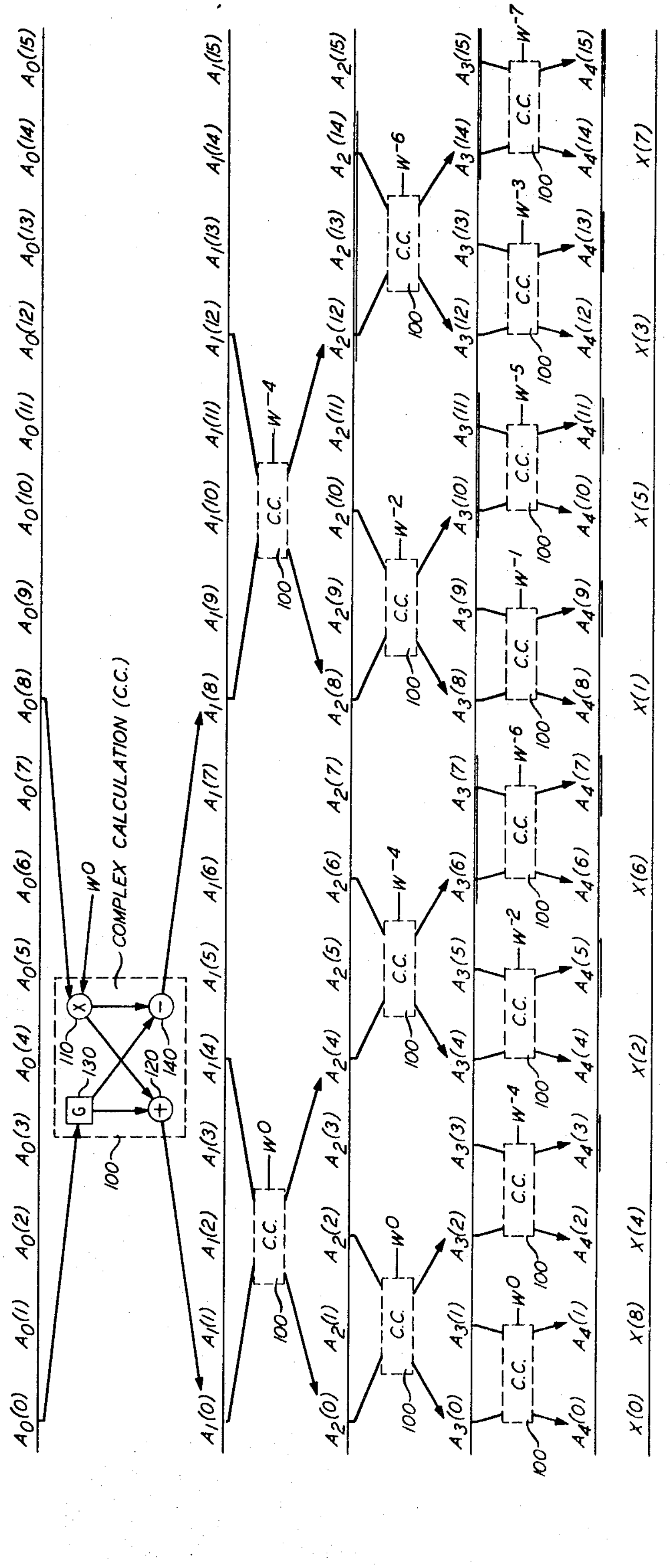
FIG. 3 is a flow chart illustrating the prior art Cooley-Tukey FFT algorithm.

The detailed descriptions to follow are presented largely in terms of algorithms. These algorithmic descriptions are the means used by those skilled in the data processing art to most effectively convey the substance of their work to others skilled in the data processing arts.

An algorithm is here, and generally, conceived to be a sequence of steps leading to a desired result. These steps are those requiring physical manipulations of physical quantities. Usually, though not necessarily, these quantities take the form of electrical or magnetic signals capable of being stored; transferred, combined, compared, and otherwise manipulated. It proves convenient at times, principally for reasons of common usage, to refer to these signals as samples, values, elements, terms, real-valued quantities, complex-valued quantities, numbers of the like. It should be borne in mind, however, that all of these and similar terms are to be associated with the appropriate physical quantities and are merely convenient labels applied to these quantities.

Further, the manipulations performed are often referred to in terms, such as adding, which are commonly associated with mental operations performed by a human operator. No human operator is necessary, or desirable in most cases, in any of the operations described herein; the operations are machine operations. Useful machines for performing the operations of the present invention include general purpose computers of the IBM 7090/94 or various of the IBM System 360 class, the GE-600 class or other similar machines. In all cases there should be borne in mind the distinction between the method operations in operating a computer and the method of computation itself. The present invention relates to method steps for operating a computer in processing electrical or other (e.g., mechanical, chemical) physical signals to generate other desired physical signals. The present invention also relates to apparatus for performing these operations.

The algorithms presented herein are not inherently related to any particular computer or other apparatus. In particular, various general purpose machines, including those mentioned above, may be used, or it may prove more convenient to construct more specialized apparatus to perform the required method steps. The required structure for various of these machines will appear from the description given below.

REVIEW OF PRIOR ART TECHNIQUES

This section includes a description of prior art techniques which are helpful in understanding various aspects of the present invention. Certain of the matters discussed represent material which becomes clear only in light of the present invention.

Given a set of $N=2^m$ input signals, $A_0(k)$, $k=0, 1,...,N-$, representing samples of a time-function taken at equally spaced intervals, starting with $A_0(0)$ at the arbitrarily chosen time origin, it is often desired to find a set of complex coefficients $X(j)$ capable of representing the samples as a Fourier series. If the $A_0(k)$ are complex and all independent, the $X(j)$ are complex and independent as well. The indices $j$ and $k$ both range from 0 to $N-1$, and can be expressed in binary form by $$k=k_{m11}\cdot 2^{m11}+k_{m12}\cdot 2^{m12}\text{az}...+k_1\cdot 2+k_0$$

and $$j=j_{m11}\cdot 2^{m11}+j_{m12}\cdot 2^{m12}+...+j_1\cdot 2+j_0$$

where each of the $k_i$ and $j_i$ may have values 0 or 1 for $i, j=0,1, 2,...,m-$.

Previously known techniques teach that the calculation of the $X(j)$ can be reduced to the iterative calculation of sequences of increasingly comprehensive Fourier series terms $A_p(k$ where $p$ assumes values from 1 to $m$. The final results are obtained by the identification of the $A_m(k)$ with corresponding ones of $X(j)$. In particular, it is found that the identification proceeds in accordance with the relation $$X(j_{m11}j_{m12},...j_1j_0)=AA_m(j_0, j_1,...j_{m11}),$$

or simply that in the process of calculating the $A_m$, (i.e., iterating from $A_0(k)$ to $X(j)$), the binary representation of the indices have become reversed in sequence, so that the $X(j)$ do not immediately appear in ascending order.

The recursive formula for the $A_p$ is given by $$A_1(j_0, k_{m-2}, \ldots, k_0) = \sum_{k_{m-1}=0}^{1} A(k_{m-1}, \ldots, k_0) W^{j_0 k_{m-1} 2^{m-1}}$$

and in general $$A_p(j_0, \ldots, j_{(p-1)}, k_{(m-p-1)}, \ldots, k_0) = \sum_{k_{m-p}=0}^{1} A_{p-1}(j_0, \ldots, j_{p-2}, k_{m-p}, \ldots, k_0) \cdot W^{(j_{p-1}2^{p-1}+\cdots+j_0)k_{m-p}2^{m-p}}$$

where $$W=e^{\frac{2\pi i}{2^m}} \text{ and } N=2^m$$

The equations for $N=r_1,r_2,r_3,...r_m$ are given by G. D. Bergland in "The Fast Fourier Transform Recursive Equations for Arbitrary Length Records," *Math. of Computation*, Vol. 21, pp. 236—238.

An interpretation and further discussion of the above-outlined prior art techniques is provided in a paper by R. R. Shively "A Digital Processor to Perform A Fast Fourier Transform," *First Annual IEEE Computer Conference Proceedings*, 1967, pp. 21—24. Other papers found to be useful in understanding these techniques include "Applications of the Fast Fourier Transform method," by J. W. Cooley, *Proceedings of the IBM Scientific Computing Symposium*, Yorktown Heights, New York, 1966 and "What is the Fast Fourier Transform?" *IEEE Transactions on Audio and Electroacoustics*, Vol. AU-15, June 1967, pp. 45—55.

These and other papers describe the sequence of $A_i$ values at each iteration as being sets of unnormalized Fourier coefficients formed from interleaved sets of samples. The original input samples, the $A_0$ values, can be thought of as N distinct one-term Fourier series representations of the DC value of the input time function. Thus, the N-term sequence of $A_0$'s may be interpreted as N separate coefficients $X(0)$.

The $A_1$ values are estimates of the DC term and the first harmonic, i.e., the $X(0)$ and $X(1)$ Fourier coefficients as evaluated from $N/2$ separate 2-term Fourier series. The terms in the first half of the $A_1$'s represent $X(0)$ coefficients, and the second-half terms represent $X(1)$ coefficients.

In like manner, the $A_2$'s represent $X(0)$, $X(1)$, $X(2)$ and $X(3)$ Fourier coefficients as evaluated from $N/4$ separate 4-term Fourier series, and the $A_3$'s represent the Fourier coefficients evaluated from $N/8$ separate 8-term Fourier series.

In each case, a stage in the recursive algorithm represents combining unnormalized Fourier coefficients formed from two interleaved sets of samples to form twice as many Fourier coefficients (because the effective sampling rate is doubled) from the combined set.

The chart, shown in FIG. 1 is useful in illustrating this computational process. Across the top of FIG. 1 are listed the index numbers $k$ ranging from 0 to 31 for the case $N=2^m32$. In the next five lines are listed the corresponding binary digit values $k_4$, $k_3$, $k_2$, $k_1$, and $k_0$. Next are listed the input data $A_0(k)$ which are typically entered sequentially into a set of registers. When the input samples are complex, two words of storage are typically required for each sample point.

The first iteration requires the exhaustive pairing of elements from the given input data, one from the first half (left half in FIG. 1) and one from the second half. These elements are, in turn, added and the sum entered in the position vacated by the selection of the first half elements. In addition, the value of the second half element is subtracted from that of the first half element and the difference stored in the vacated position in the second half.

The reference to 0° in the left-hand indicates that the exponential (phasor) involved in a degenerate (0°) one having the value of +1. Similarly the reference to 180° indicates a phasor having value −1. In subsequent iterations the phasor angle is appropriately indicated. All combining operations may be considered to be additions if the proper phasor value, including sign, are used.

When this pair selection and combination is complete, the resulting information in the form of sequence $A_1$ is considered to be separated into two equal sized groups of elements and no further interaction takes place between these groups. The first-half group represents even-order harmonics and the second-half group represents odd-order terms in the intermediate Fourier series.

The second iteration (for generating the sequence $A_2$) involves selection as before only with respect to the even order (first-half) set; the second-half set is treated differently, as will be seen below. The operations of the first iteration are repeated, i.e., this first-half set of $A_1$ is divided into two groups and respective elements from each of these two groups are added, subtracted and the results stored in the locations previously occupied by the operands.

With respect to the second half of $A_1$, the elements are split into two groups as before, but the right-half signals of the second half of $A_1$ (i.e., the rightmost quarter of $A_1$ in FIG. 1) are multiplied by a 90° phasor before being added and subtracted to the corresponding left-half (third quarter of $A_1$) numbers. Even if the given data are complex, this multiplication represents no more than an interchanges of real and imaginary values, with proper account of signs, and adding or subtracting. With pure real inputs, it results only in writing the second set of numbers in the imaginary registers with proper account of sign. These latter observations are not made use of in prior art discussions.

The third iteration (for generating $A_3$) becomes more complicated; there are now four separate groups of $A_2$ to deal with. The first and second are treated just as the two were treated in the second iteration. The third group is divided in two as usual and its second-half terms are multiplied by a 45° phasor and then added and subtracted to the first-half terms. The fourth group uses a 135° phasor.

In the fourth iteration the first four groups are treated as in the third iteration, but for each of the remaining four groups the phasors are increased by 22.5° over those used in the first four groups.

By this time the pattern is evident. The first half of the groups in an iteration are treated as were the entire predecessor set in the previous iteration. The second-half signals receive similar treatment except for the addition of $360/2^{p}$° of phase shift. In the present case ($N$=32) the desired final results are obtained after five iterations.

The Cooley-Tukey algorithm for complex time series is shown diagrammatically in FIG. 3 for the example of $N$=16. The basic set of mathematical operations is represented by the block 100 further identified as performing a "Complex Calculation" which has for its operands the paired complex value input signals. Block 100 denotes that (1) the second complex input is multiplied in block 110 by the appropriate power of $W$, (where $W=\exp(2\pi i/N)$), (2) the resulting product is added to block 120 to the first complex input to form the first output term, and (3) this product is subtracted in block 140 from the first input term to form the second output term. Block 130, further identified as "G," indicates only a temporary storage of the first input signal and does not denote an arithmetic operation.

Although this identical set of "complex calculations" is actually performed $N/2$ times during each iteration, FIG. 3 only shows the accessing and storage patterns for the first set in each group. Each pattern shown is applied sequentially to all of the operands in its group. In the first iteration, for example, the set of "complex calculations" is shown applied to the $A_0$(0 and $A_0$(8) terms. It is next applied to the $A_0$(1) and $A_0$(9 terms, the $A_0$(2) and $A_0$(10) terms, and so on. By showing only the first operation of each sequence, the diagram can be kept quite simple while still denoting all of the necessary information.

BASIS FOR THE REVISED ALGORITHM FOR REAL-VALUED INPUTS

As outlined above, the prior art process requires $2N$ registers each capable of storing one component of a complex number. This number of registers is just sufficient to store the $N$ complex numbers representing $X(j)$; $X(0)$ and $X(N/2)$ turn out to be real numbers if the input samples are real. However, it is important to not in connection with the present invention that if the inputs are real, the value of $$X(N-a8j)=X^*(j),$$

where * indicates complex conjugation. Thus when the input values are real, the prior art process has produced coefficients in conjugate pairs, except for $X(0)$ and $X(N/2)$ which are real. This redundancy was not recognized in the prior art. Only those values of $j$ less than $N/2$ are seen to be required to be computed explicitly. The sufficiency of this reduced computation was likewise not recognized in the prior art. The line under $A_5$ of the chart in FIG. 1 lists the decimal values of index $j$ and the next line lists $(32-j)$ where $j$ is over 16.

It can be seen from these last two lines of FIG. 1 that all of the desired odd-harmonic coefficients or their complex conjugates are given by either the third or fourth quarter of the results, and one or the other can be deleted. Furthermore, these calculations are entirely separate after the first iteration, so the duplicate calculations can be omitted.

The second iteration involves multiplying the last quarter of the entries by a 90° phasor and adding to the third quarter. With real input entries, this produces complex numbers for the first time. Since only $N/2$ complex numbers are needed, the registers which held the last quarter of the real numbers generated upon the first iteration can be used to hold the imaginary parts of the operands, which imaginary parts are already stored in the appropriate locations when the second iteration begins. Thus, in effect, the second iteration becomes superfluous for the odd group.

By virtue of the leftward motion of the operating phasors in successive iterations, the same is true for off multiples of two in the third iteration and for odd multiples of $2^{p/2}$ in the p'th iteration. The redundant computations are indicated by stippling in FIG. 1.

The above discussion of the redundancy inherent in the prior art FFT techniques is summarized in FIG. 2 for the case $N=2^m=8$. There, a set of graphs are presented which show the $A_0$'s, $A_1$'s, etc., as Fourier coefficients displayed as a function of frequency. Note that the set of $A_0$ and $A_1$ values are both composed of only real values. However, the set of $A_2$ values consist of $N/2$ real values (the $X(0)$ and $X(2)$ terms), $N/4$ complex $X(1)$ terms, and $N/4$ complex $X(3)$ terms. From FIG. 2 it is apparent that the third harmonic terms are above one-half the effective sampling frequency, and since they were formed from real-valued samples, the set of $X(3)$ terms and the set of $X(1)$ terms are complex conjugates. This conjugate relationship is indicated by the brackets in FIG. 2. Thus, only the $N/4$ values of the first harmonic are truly independent. This means that to store the independent $A_2$ values we need storage for $N/2$ real values and $N/4$ complex values, i.e., $N$ storage locations when each complex component is stored in a separate location.

Analogously, the $A_3$ values representing the fifth, sixth, and seventh harmonics are complex conjugates of the third, second and first harmonics, respectively. Since the $X(0)$ and $X(4)$ terms are real and only the $X(1)$, $X(2)$ and $X(3)$ complex terms must be saved, we still require only N storage locations. Again the conjugate pairs are indicated by brackets.

This process continues until at the last stage the $N/2-1$ independent complex Fourier coefficients and the two independent real Fourier coefficients are formed by combining all $N$ of the original real samples. Thus, it is apparent that for a real-valued time series of $N$ samples, we have only $N$ independent signals at the beginning and $N$ independent signals at the end (i.e., $N/2-1$ complex values and two real value), and no additional storage is required in the intervening steps. Since the discarded intermediate results at any stage can be formed by simply conjugating the appropriate saved value, this process proves to be quite convenient to implement.

DESCRIPTION OF THE IMPROVED REAL-VALUED INPUT ALGORITHM

An FFT algorithm will now be described which realizes the efficiencies available as described above by generating only the $N/2+1$ independent Fourier coefficients while preserving the order and symmetry which makes the original (complex) Cooley-Tukey algorithm so attractive. This description is most profitably read in conjunction with the preceding discussion which relate to a mixture of old and new techniques.

Since the input series consists of only $N$ real values and the resulting Fourier series consists of only $N/2-1$ complex values and two real values, it is convenient to perform all of the iterations using an array of only N real storage locations. This compares with the N complex storage locations required in implementing the complex Cooley-Tukey algorithm.

It is also desirable to keep the indexing of intermediate results regular and the number of different mathematical operations required to a minimum. By deviating from the Cooley-Tukey order of computation, in accordance with one embodiment of the present invention, one can achieve both a regular indexing pattern and a standard set of mathematical operations.

It is convenient to describe the real-valued input algorithm in terms of its deviation from the Cooley-Tukey procedure illustrated in FIG. 3. The real-valued-input FFT algorithm in accordance with one embodiment of the present invention computes intermediate results in a different order than the Cooley-Tukey algorithm, but the Cooley-Tukey labeling of the intermediate results can be carried through to verify that all of the required operations are performed. As discussed in the previous section, the essential differences will be that the redundant intermediate results of the Cooley-Tukey algorithm will not be computed, and real storage locations will be assumed instead of complex storage locations. The redundant Cooley-Tukey intermediate results which will not be computed, have a double line under them in FIG. 3. In FIG. 1 these correspond to results formed from phasors of greater than 180°.

Figure 4:
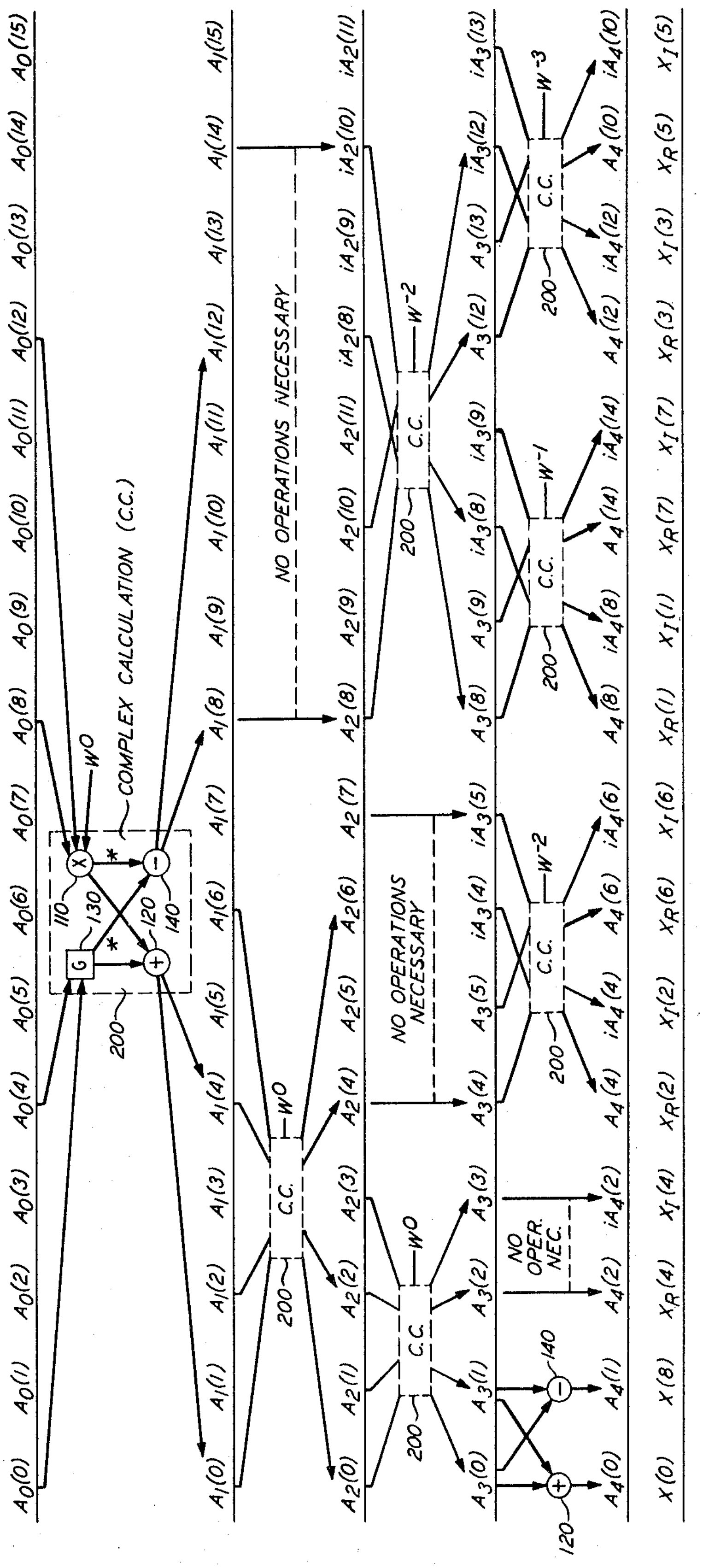
FIG. 4 is a flow chart illustrating one embodiment of the FFT algorithm for real-valued inputs in accordance with the present invention.

The computation of the independent Cooley-Tukey intermediate results via the real-valued input algorithm is shown diagrammatically in FIG. 4. Note that the set of "complex calculations" indicated by block 200 still consists of operating on two complex inputs and forming two complex outputs, but the real and imaginary parts of these terms are stored in different locations. Note also that the terms which are to enter into the subtraction are conjugated as indicated by the asterisk. As an alternative, the result of the subtraction can be conjugated.

This common set of arithmetic operations is carried through the entire algorithm as denoted by the Complex Calculation block 200 in Fig. 4. These operations differ from those performed in the Cooley-Tukey algorithm only with respect to the above-mentioned conjugation. The other operations of multiplication, addition, temporary storage, and subtraction are identical to those shown in FIG. 3 and similarly designated by numerals 110, 120, 130, and 140 respectively.

In FIG. 4 the nonredundant results of each iteration of the Cooley-Tukey algorithm are shown on separate lines with the imaginary part of each term being labeled with an "*i*" prefix. Note that the imaginary parts of the saved terms are stored in the locations vacated by the discarded terms. By deviating from the computational order of the Cooley-Tukey algorithm, an orderly indexing pattern is obtained and the real and imaginary parts of each Fourier coefficient are formed in adjacent locations.

The objective of maintaining an orderly and easily implemented indexing pattern is conveniently accomplished by making a minor change to the algorithm illustrated in FIG. 4. The operation of multiplying by $W(N/4)$, (i.e., $-i$), is illustrated as being performed in FIG. 4 by a negation and a relabeling. The negation was performed by the circuit indicated by block 200 by the two complex conjugate operations. The relabeling occurs in the "No Operations Necessary" space. If the operations below these expressions are all performed one iteration earlier, the accessing of the new "regrouped" iteration will have the regularity being sought. This procedure has the added effect of eliminating the $m^{th}$ iteration of the algorithm, except for one addition and one subtraction.

Figure 5:
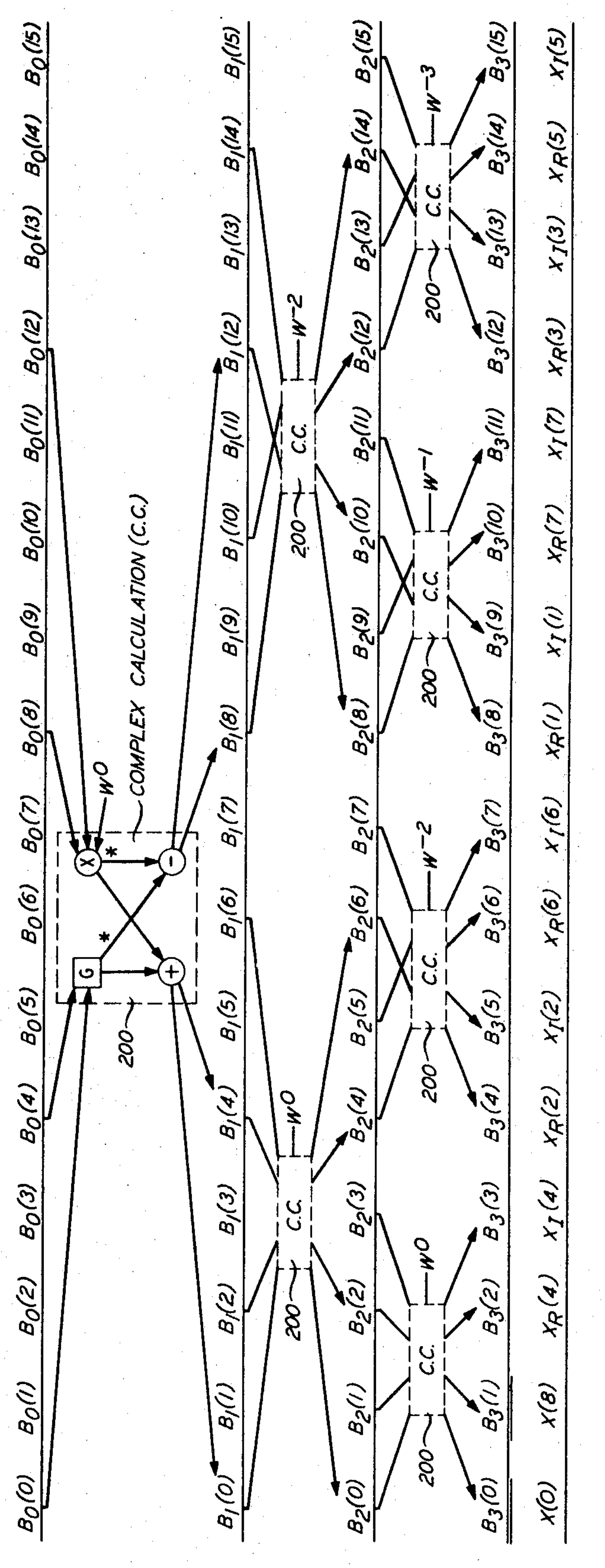
FIG. 5 illustrates a modification to the chart of FIG. 4 which algorithm shown in the modification facilitates regular indexing of operands.

Based on the observations made above, one can define a new Fast Fourier Transform algorithm for Real-Valued Inputs. This algorithm is illustrated in FIG. 5 where the complex computation involved is identical to that performed in FIG. 4. If the original series is designated $B_0(k)$ for $k=0, 1, \ldots, N-1$, the operations shown in FIG. 5 will compute the Fourier coefficients provided that one of the following conditions is met:

1. The Fourier coefficients corresponding to DC and one-half the sampling frequency must be zero. This condition requires that the $m^{th}$ iteration be unnecessary. If this condition is not met, the results $X(0)$ and $X(8)$ of the algorithm illustrated in FIG. 5 are in accurate unless step 2 below is performed. It should be noted, however, that these highest and lowest frequency components are usually of least importance; it is most often the general spectral shape or the magnitude of some intermediate coefficient that is of greatest importance.
2. $B_3(0)$ and $B_3(1)$ must be replaced by their sum and difference, respectively, often the last iteration. This condition provides the steps necessary to complete the algorithm when the highest and lowest spectral components are of interest, i.e., it completes the $m^{th}$ iteration.

MATHEMATICAL DESCRIPTION OF THE IMPROVED REAL-VALUED-INPUT ALGORITHM

A real-valued-input algorithm in accordance with the present invention is readily described by the recursive equations which are developed below as well as the flow charts shown in FIGS. 4 and 5.

Consider the problem of evaluating a complex Fourier series based on the typical case of $N=2^m$ real-valued input values. The well-known Fourier series expression is then given by $$X(j)=\sum_{k=0}^{N-1} B_0(k)W^{-jk} \qquad (1)$$

where $W=e^{2\pi i/N}$, $B_0(k)$ is real, $j=0, 1, \ldots, N/2$ and $N=2^m$

If $k$ is expressed in the form $$k=k_{m-1}\cdot 2^{m-1}+\ldots+k_1\cdot 2^1+k_0 \qquad (2)$$

the original $N$ storage locations into which the $B_0(k)$ values are stored can be labeled as $B(k_{m-1},\ldots, k_1, k_0)$ where $k_{m-1}=\ldots=k_1=k_0=0, 1$. Since two locations are required to specify each complex number and the intermediate and final results are, in general complex, it is convenient to define the following notation $$\hat{B}_L\left(k_{m-1},\ldots,k_{m-L+1},\begin{pmatrix}a_1, a_0\\ b_1, b_0\end{pmatrix},k_{m-L-2},\ldots,k_0\right)$$
$$=B_L(k_{m-1},\ldots,k_{m-L+1},a_1,a_0\,k_{m-L-2},\ldots,k_0)$$
$$+iB_L(k_{m-1},\ldots,k_{m-L+1},b_1,b_0,k_{m-L-2},\ldots,k_0) \qquad (3)$$

The $L$ subscript denotes that these values are the results of the $L^{th}$ iteration of the algorithm as outlined in FIG. 5.

As shown in FIG. 5 the operands of the first group in each iteration are accessed in a different order than the operands of the rest of the groups. For $N=2^m$, the recursive equations for the first group can be written in the form $$\hat{B}_L\left(k_{m-1},\ldots,k_{m-L+1},\begin{pmatrix}0, 0\\ 0, 1\end{pmatrix},k_{m-L-2},\ldots,k_0\right)$$
$$=\hat{B}_{L-1}\left(k_{m-1},\ldots,k_{m-L+1},\begin{pmatrix}0, 0\\ 0, 1\end{pmatrix},k_{m-L-2},\ldots,k_0\right)$$
$$+\hat{B}_{L-1}\left(k_{m-1},\ldots,k_{m-L+1},\begin{pmatrix}1, 0\\ 1, 1\end{pmatrix},k_{m-L-2},\ldots,k_0\right)$$
$$\cdot W(k_{m-1},\ldots,k_{m-L+1}) \qquad (4)$$

and $$\hat{B}_L\left(k_{m-1},\ldots,k_{m-L+1},\begin{pmatrix}1, 0\\ 1, 1\end{pmatrix},k_{m-L-2},\ldots,k_0\right)$$
$$=\hat{B}^*_{L-1}\left(k_{m-1},\ldots,k_{m-L+1},\begin{pmatrix}0, 0\\ 0, 1\end{pmatrix},k_{m-L-2},\ldots,k_0\right)$$
$$-\hat{B}^*_{L-1}\left(k_{m-1},\ldots,k_{m-L+1},\begin{pmatrix}1, 0\\ 1, 1\end{pmatrix},k_{m-L-2},\ldots,k_0\right)$$
$$\cdot W^*(k_{m-1},\ldots,k_{m-L+1}) \qquad (5)$$

where $k_{m-1}=\ldots=k_{m-L-1}=0$, the asterisk denotes a complex conjugate, and $L=1, 2, \ldots, m-1$. Since W(0) is actually equal to 1+i0, the multiplication could be dropped from these equations. The product is included above, however, to show the tie between the operations of the first group and succeeding groups.

For all groups where W(0) is not the multiplier, the following equations hold.

$$\hat{B}_L\left(k_{m-1},\ldots,k_{m-L+1},\begin{pmatrix}0,0\\0,1\end{pmatrix},k_{m-L-2},\ldots,k_0\right)$$
$$=\hat{B}_{L-1}\left(k_{m-1},\ldots,k_{m-L+1},\begin{pmatrix}0,0\\1,0\end{pmatrix},k_{m-L-2},\ldots,k_0\right)$$
$$+\hat{B}_{L-1}\left(k_{m-1},\ldots,k_{m-L+1},\begin{pmatrix}0,1\\1,1\end{pmatrix},k_{m-L-2},\ldots,k_0\right)\cdot W(k_{m-1},\ldots,k_{m-L+1}) \quad (6)$$

$$\hat{B}_L\left(k_{m-1},\ldots,k_{m-L+1},\begin{pmatrix}1,0\\1,1\end{pmatrix},k_{m-L-2},\ldots,k_0\right)$$
$$=\hat{B}^*_{L-1}\left(k_{m-1},\ldots,k_{m-L+1},\begin{pmatrix}0,0\\1,0\end{pmatrix},k_{m-L-2},\ldots,k_0\right)$$
$$-\hat{B}^*_{L-1}\left(k_{m-1},\ldots,k_{m-L+1},\begin{pmatrix}0,1\\1,1\end{pmatrix},k_{m-L-2},\ldots,k_0\right)\cdot W^*(k_{m-1},\ldots,k_{m-L+1}) \quad (7)$$

These equations hold for $L=1,2,\ldots,m-1$. The Fourier transformation is completed by replacing $B_{m11}(0)$ and $B_{m11}(1)$ with their sum and difference, respectively. When the highest frequency computed is known to be zero, an equivalent operation would be to double $B_{m11}(0)$ and set $B_{m11}(1)=0$. However for a one-sided transform even the doubling could be eliminated, resulting in a common normalizing factor of $N/2$ for all of the Fourier coefficients.

With the exception of $B_{m11}(0)$ and $B_{m11}(1)$, the $$B_{m-1}\left(k_{m-1},\ldots,k_2,k_1,\begin{pmatrix}0\\1\end{pmatrix}\right)$$

terms represent the complex Fourier coefficients of the original $B_0$ series. The $B_{m11}(0)$ term is a real number representing the DC term and the $B_{m11}(1)$ term represents the $N/2^{th}$ harmonic. As in the case of the Cooley-Tukey results, these coefficients are not in order of ascending frequency, so reordering is required. Methods of performing this reordering are discussed below.

It should be noted that in performing the operations of Equations (4), (5), (6), and (7), the assumption was made that the W table started with the sequence $W^0$, $W^{1N/8}$, $W^{1N/16}$, $W^{13N/16}$, etc. If this progression is continued, the equations will call upon N/4 complex exponential weights. With one additional observation, it is possible to reduce this table to N/8 complex exponential weights plus the term $1+i0$. Note that the last two values of $W$ called in FIG. 5 are $W^{11}$ and $W^{13}$. Since, for $N=16$ we have $W^{13}=-i(W^{11=})$, one could simply negate and interchange the real and imaginary parts of the $W^{11}$ to obtain $W^{13}$. This property generalizes conveniently such that powers of $W$ of greater magnitude than N/8 can always be obtained by simply negating and interchanging the real and imaginary parts of the proceeding $W$. This operation can be performed quite conveniently in either software or hardware realizations of the algorithm. Thus it is convenient to perform the Fourier transform using a $W$ table containing only N/8 entries.

When an algorithm using positive powers of $W$ is used, the use of a table of N/8 complex weights is made even simpler. In this case, starting with the fourth group in any iteration, the powers of $W$ required for the even-numbered groups are formed by simply interchanging the real and imaginary parts of the $W$ used in the preceding group. The only disadvantage of the algorithm using the positive powers of $W$ is that the same "complex calculation" cannot be used for all of the arithmetic operations without a special modification for the first group. Note than when the negative powers of $W$ were used in FIG. 5, the same arithmetic unit was used without modification in all of the $m-1$ iterations.

COMPLEX EXPONENTIAL WEIGHT TABLE

The Fourier analysis recursive equations presuppose in some embodiments of the present invention a table of complex exponential weights which can be accessed sequentially in performing each iteration of the algorithm. One way of generating the number sequence required for forming the W table is shown schematically in FIG. 6. For a given value of N, the sequence can be progressively doubled until the N/4 or N/8 exponents required have been generated.

The algorithm for doubling the length of each number sequence is to (1) multiply the second entry of the sequence by two and make this product the second entry of the new sequence, (2) subtract each nonzero entry of the sequence from twice the product formed in step 1 (these differences form the rest of the even entries of the new sequence), and (3) the odd entries of the new sequence are the numbers of the original sequence.

Once the required sequence of W exponents is found, the corresponding W terms can be found and stored in this "-scrambled" order. The table formed in this way is called sequentially during each iteration. A table computed for use with $N=2^m$ can be used without any changes for any $N=2^q$ where $q\leq m$.

REORDERING

In one hardware embodiment of the algorithm of the present invention, the output of a binary counter is conveniently suitably modified to read the resulting Fourier coefficients out of the N real locations in order of ascending frequency. Although in place reordering can be performed, it has not proven to be very efficient.

In such a hardware indexing unit, the address signal sequence for reordering is generated by first performing bitwise tests on the "flipped" binary equivalent of the harmonic number, from the least significant bit to, but not including, the leftmost "one". These tests require that the bits tested be compared with a test signal having a binary value known as the "state sought." As this is being done, each bit tested will be replaced by a "one" if the state sought matches the state found at a given bit, and will be replaced by a "zero" otherwise. The state sought continues to alternate between "one" and "zero." It starts as a "one" for each address and changes after each match is found.

Although the same signal sequence can be generated with software, it has proven more efficient to store part of the signals representing the sequence of FIG. 6 in a table and to read the scrambled Fourier coefficients into a second array reordered.

Figure 8:
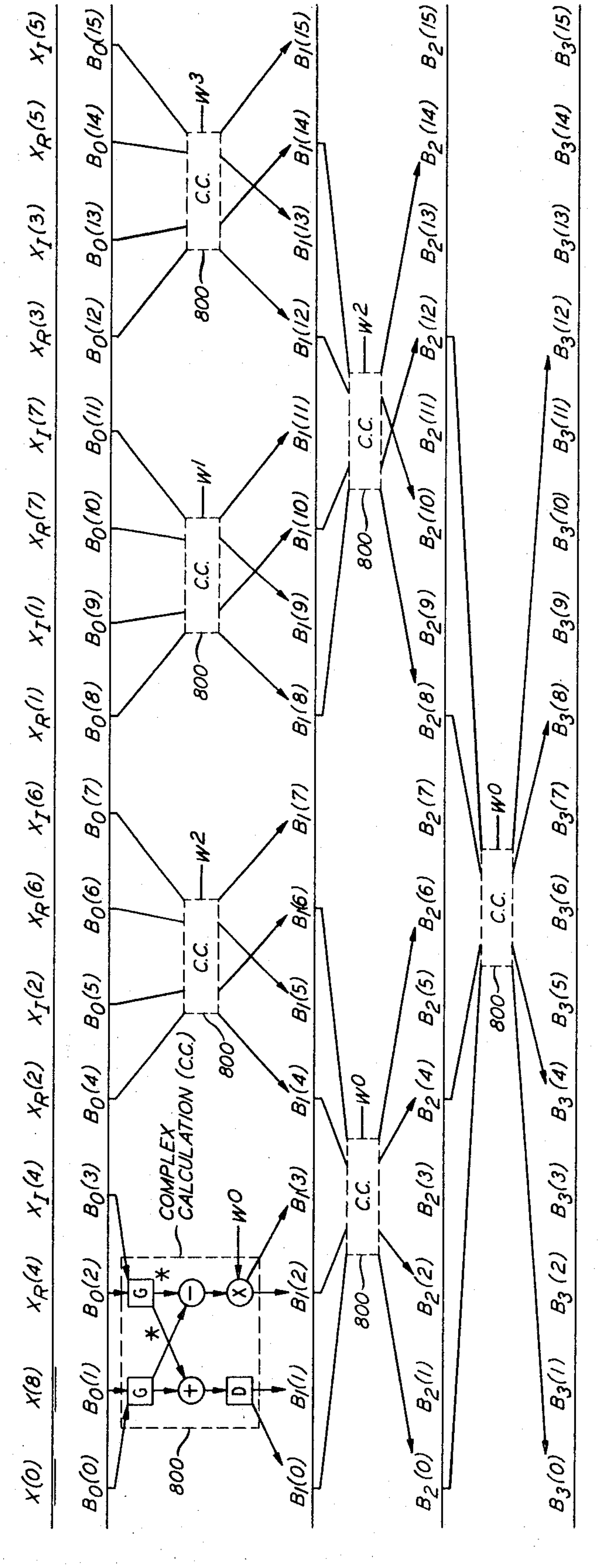
FIG. 8 NOTATION AND NOMENCLATURE an FFT algorithm for performing Fourier synthesis.

While the above description has proceeded in the context of a Fourier analysis of real-valued input samples, it is clear that one can "unwrap" the operations of the real-valued Fourier analysis algorithm to obtain a Fourier synthesis algorithm which has the same properties. Where this is desired it is convenient to start with the Fourier coefficients in the order in which the Fourier analysis algorithm above would have computed them without reordering. Thus by starting with $N/2-1$ complex and two real numbers in the given scrambled form, the corresponding N-term real series can be computed in the correct order. The form of the Fourier synthesis algorithm, for the example of $N=16$, is shown in FIG. 8. Note that the steps labeled collectively as "Complex Calculation" and identified by numeral 800 consists of the operations shown in FIG. 5 but performed in reversed order. This algorithm is therefore related to the Fourier analysis algorithm in much the same way that the Sande-Tukey algorithm is related to the Cooley-Tukey algorithm. The Sande-Tukey algorithm is described, for example, in Bingham et al., "Modern Techniques of Power Spectrum Estimation" *IEEE Transactions on Audio and Electroacoustics*, vol. AV–15, pp. 56—66, June 1967.

A variation of the real-valued input algorithm has been developed which alters the regular structure of the indexing, but makes reordering more convenient and allows more convenient extensions to radix-4, radix-8, and arbitrary-radix algorithms. In this form the real parts of each intermediate result is kept in the same relative location as in the Cooley-Tukey algorithm. The imaginary part is stored in the corresponding location vacated by the redundant intermediate result related by the complex conjugate relation.

In an arbitrary-radix, real-valued algorithm, when N is the product of an arbitrary set of integers, the recursive equations are again interpreted as forming sets of unnormalized Fourier coefficients. See Bergland, "The Fast Fourier Transform Recursive Equations for Arbitrary Length Records," *Math. of Comp.*, Vol. 21 pp. 236—238, Apr. 1967. If N is represented as the product $r_1r_2...r_n$, the first iteration consists of computing $r_2r_3..r_n$ sets of $r_1$ term Fourier series. The second iteration consists of computing $r_3r_4...r_n$ sets of $r_1r_2$ term Fourier series. Thus the $L^{th}$ iteration consists of computing $r_{L+1}r_{L+2}...r_n$ sets of $r_1r_2...r_L$ term Fourier series.

When the original time series is real, the symmetry about the folding frequency will still always exist and complex numbers will always appear in conjugate pairs. The only departure from the diagrams given above will be for cases where the product $r_1r_2...r_L$ is an odd number. In this case the folding frequency is not one of the coefficients which is computed, so each set will consist of only one real number (the DC term) together with $(r_1r_2...r_L)/2$ complex conjugate pairs.

As in the radix-2 algorithm discussed herein, it is again convenient to compute and store only those coefficients at or below the folding frequency. The storing procedure, however, is changed such that the imaginary part of each saved intermediate result is stored in the relative location which would ordinarily have held its redundant complex conjugate. This results in an orderly procedure which extends conveniently to radix-4, radix-8, and arbitrary-radix algorithms. It also makes in place reordering more manageable.

TYPICAL RESULTS

The Fourier analysis algorithm discussed above requires approximately one-half the arithmetic operations of the original complex Cooley-Tukey radix-2 algorithm. For $N=2^m$ the number of operations required by the Cooley-Tukey radix-2 algorithm and the Real-Valued-Input (FTRVI) algorithm are given in Table I.

TABLE I.—ARITHMETIC OPERATIONS REQUIRED FOR $N=2^m$

| Algorithm | Real multiplications | Real additions |
|---|---|---|
| FTRVI | $(m-3.5)N+6$ | $(1.5m-2.5)N+4$ |
| Radix 2 | $(2m-7)N+12$ | $(3m-3)N+4$ |

The expressions in Table I assume that referencing factors (or twiddle factors) of $\exp(i0)$, $\exp(\pm i\pi/2)$ and $\pm\exp(\pm i\pi/4)$ are treated as special cases. Also, in the FTRVI algorithm, the normalizing factor for everything but the DC term and the folding frequency is N/2 instead of N. If these Fourier coefficients were doubled, this would change the number of real additions in FTRVI to $(1.5m-1.5)N+2$ which is exactly half of the corresponding number for the complex radix-2 algorithm. Since this doubling is usually not necessary, the number of additions is shown as slightly less than half.

The savings effected by the now well-known radix-4 and radix-8 complex input algorithms can also be made in the real-valued input algorithm. Thus a further computational reduction of approximately 30 percent is available.

In terms of hardware implementations, the execution times and memory requirements can be halved for the Fast Fourier Transform Processor described by Shively in the Shively et al. application, supra, and similar processors.

HARDWARE AND SOFTWARE IMPLEMENTATIONS

The present invention has been disclosed above primarily in the form of an algorithm readily understandable to one skilled in the art. It should be recognized, however, that those wishing to practice the invention may wish to construct apparatus for performing one or more of the operations described above. Others will find it more convenient to practice the present invention on a general purpose computer, or other programmable machines having more specialized capabilities. In the latter cases, it will only be necessary for users of the invention to code the operations above in accordance with the provisions and limitations of the particular programmable machine being used.

FIG. 7 shows a block diagram of a hardware embodiment of the present invention. Shown there is a complex calculator 700 for performing the operations shown for example, in FIG. 4 as block 200 and in FIG. 5 as block 300. This may conveniently take the form of that described in the Shively reference, supra, or others of that broad class. Also shown in FIG. 7 is a store 710 for storing the intermediate results generated at each iteration, and of course, the original input sequence. These signals may be presented and stored in any convenient form including electrical or magnetic polarity indications. Exponential value store 720 is used to store signals representing the exponential values needed in the complex calculations. Indexing circuit 730 performs the selection of operands from store 710 and exponential values from store 720 as prescribed by the above-described algorithm. Reordering circuit 740 is useful for reordering the sequence of final results so that the final signals output may be presented in order of increasing frequency.

The above-described embodiments of the present invention are merely typical and in no way limit the scope of the principles and application of the present invention. Numerous and varied modifications and applications within the spirit of the present invention will occur to those skilled in the art.

In particular, the examples discussed were limited for reasons of clarity to cases of $N=32$ or less. The principles of the present invention are, however, easily applied to cases where the number of input samples is arbitrarily large.

I claim:

1. The machine method of generating a sequence of signals which represent Fourier series coefficients of an input sequence of N real-valued signals comprising the steps of:
   1. storing said input sequence of signals in a machine memory,
   2. generating an ordered set of complex-valued signals,
   3. selectively combining in a machine and according to a constant relation said stored signals and said complex-valued signals, thereby to form a new sequence of complex-valued signals none of which bears a necessary conjugate relation to another,
   4. storing said new sequence of signals in said machine memory in place of said sequence of signals previously stored in said machine memory, and
   5. iteratively performing steps (3) and (4) with the sequence generated by the immediately preceding iteration and said ordered set of signals entering as operands.

2. The method of claim 1 wherein said combining according to a constant relation comprises the steps of
   1. forming product signals corresponding to the product of sets of said stored signals and selected ones of said ordered set of complex-valued signals;
   2. adding said product signals to selected others of said sequentially stored signals;
   3. generating first conjugate signals corresponding to the conjugate of said product signals;
   4. generating second conjugate signals corresponding to the conjugate of said selected others of said sequentially stored signals; and
   5. forming difference signals by subtracting selected ones of said conjugate signals from selected ones of said second conjugate signals.

3. The method of claim 1 wherein said storing of said new sequence is accomplished by the steps of 1. destroying the sequence of stored signals used as operands; and
2. placing said new sequence of signals in the positions previously occupied by said destroyed signals.

4. The method of claim 1 wherein said step of generating said ordered set of complex-valued signals comprises the steps of 1. storing said ordered set of complex-valued signals; and
2. accessing said ordered set of complex signals as they are required for performing step 3 in claim 1.

5. The method of claim 1 wherein said step of generating said ordered set of complex-valued signals comprises the steps of 1. forming an ordered sequence of exponent signals representing a sequence of integer coefficients $C_j$, $j=0, 1, \ldots, m-b$; and
2. forming a sequence of signals corresponding to $W^{C_j}$, $j=0, 1, \ldots, m-1$, where $W=e^{2\pi i/N}$.

6. The method of claim 5 wherein said step of forming an ordered sequence of exponent signals comprises the steps of I. sequentially generating signals representing the integers 0 and 1, thereby forming a base sequence of signals;
II. forming a new sequence of signals thereby doubling the length of said base sequence by performing the steps of
   A. multiplying the second entry of said base sequence by 2;
   B. sequentially forming the additional even signals of said new sequence by subtracting in turn each nonzero signal of said base sequence from a signal representing twice said new second element;
   C. reordering the original ones of said base sequence of signals to be the odd ones of said new sequence;
III. iteratively repeating step II, with said new sequence being used as the base sequence for the succeeding iteration, until said base sequence comprises the desired number $m$ of said exponent signals.

7. The method of claim 1 wherein said step of generating said ordered set of complex-valued signals comprises the steps of 1. forming an ordered sequence of exponent signals representing a sequence of integer values $C_j$, $j=0, 1, \ldots, N/8$;
2. forming a first set of exponential signals corresponding to $W^{C_j}$, $j=0, 1, \ldots, N/8$, where $W=e^{2\pi i/N}$;
3. forming a set of $N/8-1$ additional signals by sequentially performing on selected ones of said exponential signals the steps of
   A. generating a set of negated signals corresponding to selected ones of said exponential signals; and
   B. interchanging the real and imaginary components of said negated signals.

8. The method of claim 1 further comprising the steps of:

A. generating a sequence of reference signals corresponding to a sequence of binary numbers each of which binary numbers represents the flipped binary equivalent of a Fourier harmonic number:
B. generating a test signal having an initial value corresponding to a binary "1;"
C. testing in order of increasing significance each bit of a given one of said reference signals except the most significant "1" for equivalence with said test signal;
D. replacing each bit tested with a binary "1" when an equivalence is found upon said testing;
E. replacing each bit tested with a binary "0" when no equivalence is found upon said testing;
F. complementing said test signal each time an equivalence is found upon said testing; and
G. selecting a result corresponding to the given reference signal from a location in storage specified by said reference signals as modified in steps (D) and (E).

9. The machine method of generating a sequence of signals corresponding to a sequence of numbers which signals represent Fourier series coefficients of an input sequence of N real-valued signals comprising the steps of:

1. storing said input sequence of signals in a machine memory;
2. generating an ordered set of complex-valued signals by performing the steps of
   A. forming an ordered sequence of exponent signals representing a sequence of integer values $C_j$, $j=0, 1, \ldots, N/8$;
   B. forming a first set of exponential signals corresponding to $W^{C_j}$, $j!0, 1 \ldots, N/8$;
   C. adding to said first set of exponential signals additional exponential signals formed by interchanging the real and imaginary parts of selected signals in said first set of exponential signals;
3. selectively combining said stored signals and said complex-valued signals to form a new sequence of complex-valued signals none of which bears a necessary conjugate relation to another;
4. storing said new sequence of signals in said machine memory in place of said sequence of signals previously stored in said machine memory;
5. iteratively performing steps (3) and (4) with the sequence generated by the immediately preceding iteration and said ordered set of signals entering as operands.

10. The machine method for generating a sequence of signals which represent the Fourier series coefficients corresponding to an input sequence of real-valued signals comprising the steps of:

1. generating an ordered set of complex-valued signals; and
2. iteratively selectively combining in a machine and according to a constant relation first operand signals and said complex-valued signals, thereby to form a new sequence of complex-valued signals none of which bears a necessary conjugate relation to another, said first operand signals comprising said input signals upon the first iteration and said new sequence of signals generated at the immediately preceding iteration upon iterations other than the first.

11. Apparatus for generating a sequence of signals which represent Fourier series coefficients corresponding to an input sequence of real-valued signals comprising:

1. means for generating an ordered set of complex-valued signals; and
2. means for iteratively selectively combining according to a constant relation first operand signals and said complex-valued signals, thereby to form a new sequence of complex-valued signals none of which bears a necessary conjugate relation to another, said first operand signals comprising said input signals upon the first iteration and said new sequence of signals generated at the immediately preceding iteration upon iterations other than the first.

12. Apparatus according to claim 11 wherein said means for combining comprises a plurality of ordered cascaded stages each comprising:

1. input means for receiving said first operand signals, and
2. means for operating on said first operand signals and said complex-valued signals in accordance with said constant relation to generate said new sequence.

13. Apparatus according to claim 12 wherein said means for combining further comprises at each stage but the last, output means for applying said new sequence to the input means of the succeeding one of said stages.

14. Apparatus according to claim 13 wherein said means for operating comprises:

1. means for multiplying selected ones of said first operand signals by corresponding ones of said ordered set of complex-valued signals, thereby to form a sequence of product signals, and
2. means for algebraically adding selected ones of said product signals to corresponding ones of said first operand signals, thereby to form said new sequence of complex-valued signals.

15. Apparatus according to claim 14 wherein said input sequence of real-valued signals comprises $N=2^m$ signals and wherein said plurality of ordered stages comprises $m$ of said stages, $m$ being a positive integer.

16. Apparatus for generating a sequence of signals which represent Fourier series coefficients in response to an applied input sequence of real-valued signals and an applied input sequence of ordered complex-valued signals, said Fourier coefficients representing the discrete Fourier transform of said real-valued signals, comprising:

1. arithmetic means for iteratively selectively combining according to a constant relation first operand signals and said complexivalued signals, thereby to form a new sequence of complex-valued signals none of which bears a necessary conjugate relation to another, said first operand signals comprising said input signals upon the first iteration and said new sequence of signals generated at the immediately preceding iteration upon iterations other than the first, and
2. means for applying said input sequences to said arithmetic means.

17. Apparatus according to claim 16 wherein said means for combining comprises a plurality of ordered cascaded stages each comprising:

1. input means for receiving said first operand signals, and
2. means for operating on said first operand signals and said complex-valued signals in accordance with said constant relation to generate said new sequence.

18. Apparatus according to claim 17 wherein said means for combining further comprises at each stage but the last, output means for applying said new sequence to the input means of the succeeding one of said stages.

19. Apparatus according to claim 18 wherein said means for operating comprises:

1. means for multiplying selected ones of said first operand signals by corresponding ones of said ordered set of complex-valued signals, thereby to form a sequence of product signals, and
2. means for algebraically adding selected ones of said product signals to corresponding ones of said first operand signals, thereby to form said new sequence of complex-valued signals.

20. Apparatus according to claim 19 wherein said input sequence of real-valued signals comprises $N=2^m$ signals and wherein said plurality of ordered stages comprises $m$ of said stages, $m$ being a positive integer.